United States Patent
MacEachern

(10) Patent No.: US 8,016,312 B2
(45) Date of Patent: Sep. 13, 2011

(54) WHEELED MOTORCYCLE CENTER STAND

(76) Inventor: Lawrence A. MacEachern, East Jordan, MI (US)

(*) Notice: Subject to any disclaimer, the term of this patent is extended or adjusted under 35 U.S.C. 154(b) by 157 days.

(21) Appl. No.: 12/380,026

(22) Filed: Feb. 23, 2009

(65) Prior Publication Data

US 2010/0213686 A1    Aug. 26, 2010

(51) Int. Cl.
B52H 1/02 (2006.01)
B62H 1/12 (2006.01)

(52) U.S. Cl. ............ 280/300; 16/19; 254/418; 280/292; 280/303

(58) Field of Classification Search .......... 280/298–303, 280/293, 294, 295; 254/418, 422; 16/19, 16/32
See application file for complete search history.

(56) References Cited

U.S. PATENT DOCUMENTS

| | | | |
|---|---|---|---|
| 92,460 A | 7/1869 | Laurence | |
| 319,385 A * | 6/1885 | Bevan | 280/293 |
| 332,629 A * | 12/1885 | Van Valkenbergh | 16/19 |
| 476,297 A * | 6/1892 | Overs | 280/293 |
| 559,698 A * | 5/1896 | Gaston | 280/296 |
| 617,136 A * | 1/1899 | Wilkins et al. | 280/293 |
| 1,054,045 A | 2/1913 | Smith | |
| 1,185,381 A | 5/1916 | Dawson | |
| 1,251,684 A * | 1/1918 | Murray | 280/296 |
| 1,266,418 A | 5/1918 | Dawson | |
| 1,366,235 A | 1/1921 | Wright | |
| 1,403,249 A | 1/1922 | Johanknecht | |
| 2,022,604 A * | 11/1935 | Rasmuss | 280/293 |
| 2,301,036 A * | 11/1942 | Gray | 280/282 |
| 2,612,388 A | 9/1952 | McNeill et al. | |
| 2,629,611 A | 2/1953 | Covington | |
| 3,075,789 A | 1/1963 | Hott | |
| 3,602,528 A * | 8/1971 | Kelly | 280/293 |
| 4,353,571 A | 10/1982 | Anderson | |
| 5,133,569 A | 7/1992 | Rieber et al. | |
| 6,769,708 B2 | 8/2004 | Ackerly | |
| 6,981,694 B2 * | 1/2006 | Carnahan | 254/8 R |
| 7,175,192 B1 * | 2/2007 | Lu | 280/287 |
| 7,213,823 B1 * | 5/2007 | Vujtech | 280/87.021 |
| 2002/0130487 A1 * | 9/2002 | Berkmann | 280/303 |
| 2004/0195800 A1 * | 10/2004 | Mullins | 280/293 |
| 2005/0200097 A1 * | 9/2005 | Alder | 280/293 |
| 2007/0096070 A1 * | 5/2007 | Kobacker et al. | 254/131 |
| 2008/0100030 A1 | 5/2008 | Brakhage et al. | |
| 2008/0296865 A1 * | 12/2008 | Canetti | 280/301 |

FOREIGN PATENT DOCUMENTS

WO    WO/84/00337    2/1984

* cited by examiner

*Primary Examiner* — Anne Marie Boehler
(74) *Attorney, Agent, or Firm* — Paul S. Rooy PA

(57) ABSTRACT

A wheeled center stand for motorcycles. The center stand incorporates a spine rotatably attached to a frame, and at least one leg rigidly attached to the spine. The frame is attached to a motorcycle frame cross-member. At least one wheel is rotatably mounted to an extreme of a leg opposite the spine. The center stand may be extended and retracted conventionally, using a foot lever mounted to one of the legs. The wheels may be swiveling wheels or non-swiveling wheels. In the preferred embodiment, each non-swiveling wheel was mounted at a 20 degree offset relative to a stand centerline. When extended, a motorcycle to which the wheeled center stand is mounted may be rotated relative to a surface upon which it rests, such as a garage floor, with a minimum of effort. Nut plates are also taught which facilitate the mounting of the stand to a motorcycle frame cross-member.

4 Claims, 8 Drawing Sheets

WHEELED MOTORCYCLE CENTER STAND

BACKGROUND OF THE INVENTION

1. Field of the Invention

This invention relates to two-wheeled vehicles, and in particular to a wheeled motorcycle center stand.

2. Background of the Invention

Motorcycles comprise an important part of our transportation system, and have been around for over a century. Gottlieb Daimler, a German engineer, is generally credited with inventing and building the first motorcycle in 1885. He mounted a four-stroke piston engine to a wooden bicycle frame. Following a few decades of development, the motorcycle became a reliable, useful vehicle during the early 1900's.

While today's motorcycles do not differ significantly in appearance from the early models, they do incorporate important improvements. Modern motorcycles have stronger frames, more powerful engines and more dependable brakes. Larger, softer seats make riding more comfortable, and hydraulic springs help lessen road shocks.

During recent decades, as the disposable income and affinity for comfort of motorcycle afficionados have increased, large touring motorcycles have become popular. These motorcycles provide unparalleled stability, comfort and power to their riders.

One problem associated with motorcycles is the ability to turn a motorcycle around once it is parked. This can be difficult where a motorcycle is driven forward into a garage, and then it is desired to reverse the direction that the vehicle is facing, in order to drive or push the motorcycle forward out of the garage. Where insufficient room is available within the garage (or other tight quarters in which the motorcycle is located), it is necessary to turn the motorcycle around within its own length. Thus, it would be desirable to provide an apparatus to enable a motorcycle operator to turn the direction in which a motorcycle points, easily and quickly.

Another problem associated with conventional motorcycle center stands is their attachment mode to the motorcycle itself. Conventional center stands are attached to a motorcycle frame cross-member, using upward pointing bolts and nuts, each bolt extending through a respective center stand bore and a respective cross-member bore, and then threaded into a mating nut atop the motorcycle frame cross-member. The problem arises in threading the bolt into the nut, due to the general difficulty in accessing the upper surface of the motorcycle cross-member. Thus, it would be desirable to provide a nut plate which can be positioned atop the motorcycle cross-member in the correct location prior to attempting to install the center stand. Then the center stand could be positioned with each of its center stand bores aligned with a respective cross-member bore, a nut inserted through each center stand bore/cross-member bore pair, and threaded into its respective nut, which has been pre-positioned atop the cross-member.

These problems, associated with existent designs for motorcycle center stands, are illustrated in FIG. 1 which depicts a conventional center stand 2 in the extended position. Conventional center stand 2 is extended by stepping down on foot lever 8 while simultaneously pulling backwards on the motorcycle handlebars.

In the center stand 2 extended position illustrated in FIG. 1, the weight of the motorcycle to which it is attached rests on legs 4 and pads 6. Friction between pads 6 and the surface upon which they rest makes it difficult to turn around a motorcycle to which conventional center stand 2 is attached.

Conventional center stand 2 incorporates frame 14, to which legs 4 are rotatably attached. Frame 14 incorporates frame bores 15, sized to slidably admit bolt 10. Cross-member 16 is rigidly attached to the frame of a motorcycle to which conventional center stand 2 is to be attached. Cross-member 16 incorporates cross-member bores 17, also sized to slidably admit bolt 10.

Frame 14 is attached to cross-member 16 by inserting bolt 10 through a frame bore 15 and a corresponding cross-member bore 17. Nut 12 is then threaded and tightened onto bolt 10. Because of the difficulty of accessing the upper surface of cross-member 16, it is difficult and cumbersome to thread nut 12 onto bolt 10.

Thus, it would be desirable to provide a means to easily turn a motorcycle around to which conventional center stand 2 is attached, as well as to provide means to assist holding nut 12 in the proper position atop cross-member 16 so that bolt 10 may be threaded into it.

SUMMARY OF THE INVENTION

Accordingly, it is an object of the present invention to provide a wheeled motorcycle center stand which permits a motorcycle to be rotated about its center stand. Design features allowing this object to be accomplished include a wheel attached to a lower extreme of at least one center stand leg, either pivotally or fixed at an angle offset from a centerline of the center stand at an angle substantially equal to 20 degrees. Advantages associated with the accomplishment of this object include greater ease and speed in changing the direction into which a parked motorcycle faces.

It is another object of the present invention to provide a wheeled motorcycle center stand which provides means of holding a threaded bore nut in place atop a motorcycle cross-member to facilitate installation of a center stand to the cross-member. Design features allowing this object to be accomplished include nut plate having anti-rotation tabs or being manufactured of magnetic material combined with a motorcycle cross-member manufactured of ferro-magnetic material. Benefits associated with the accomplishment of this object include easier and faster motorcycle center stand installation.

It is yet another object of this invention to provide a wheeled motorcycle center stand which is inexpensive to produce. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Eight sheets of drawings are provided. Sheet one contains FIG. 1. Sheet two contains FIG. 2. Sheet three contains FIG. 3. Sheet four contains FIGS. 4, 5 and 6. Sheet five contains FIG. 7. Sheet six contains FIG. 8. Sheet seven contains FIGS. 9 and 10. Sheet eight contains FIG. 11.

DETAILED DESCRIPTION OF THE PREFERRED EMBODIMENT

Figure 2:
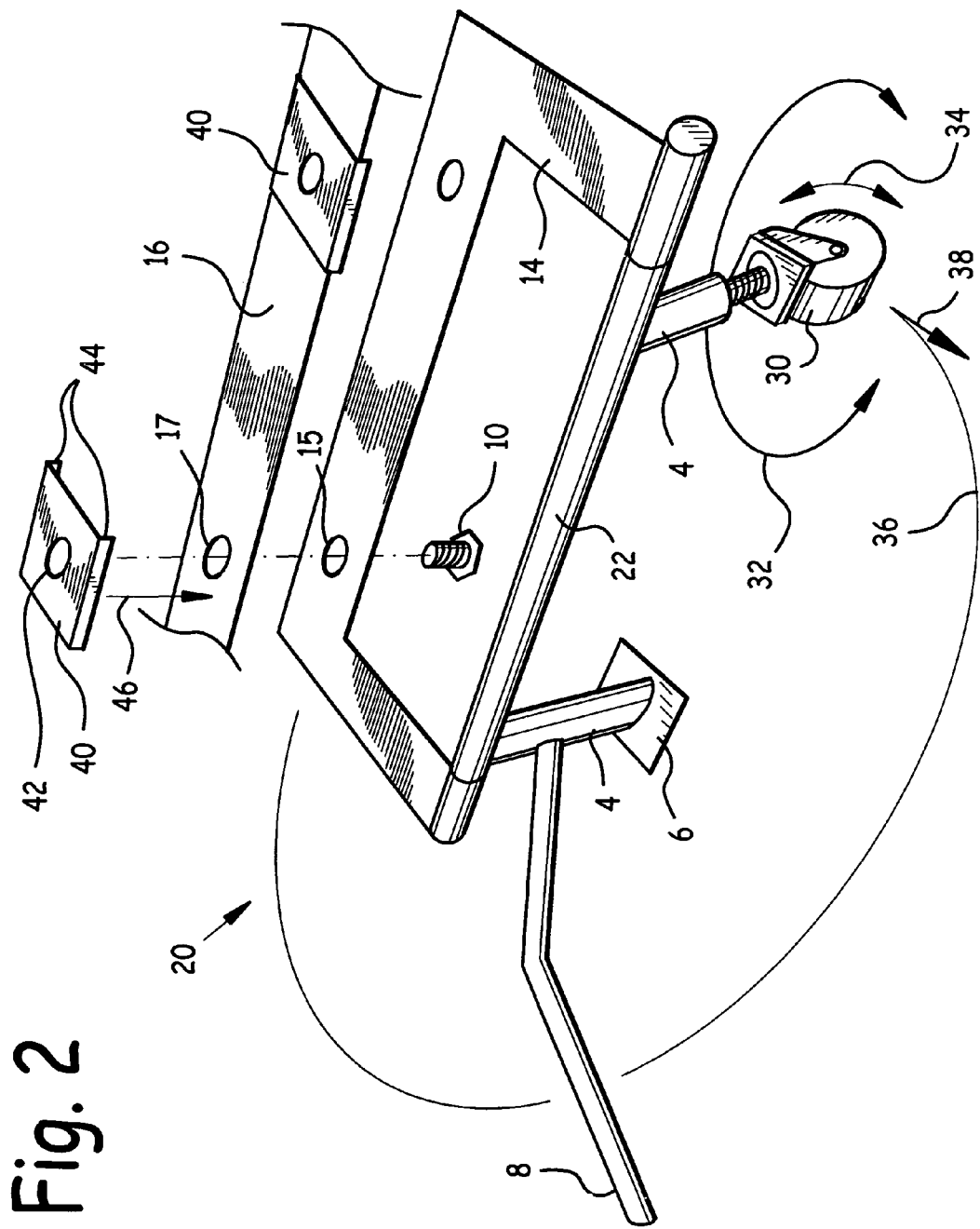
FIG. 2 is a rear quarter elevated isometric view of a wheeled motorcycle center stand incorporating two legs and one swiveling wheel, and its attachment to a motorcycle cross-member using a bolt and a nut plate having anti-rotation tabs.

FIG. 2 is a rear quarter elevated isometric view of a wheeled motorcycle center stand 20 incorporating two legs 4 and one swiveling wheel 30, and its attachment to a motorcycle cross-member 16 using a bolt 10 and a nut plate 40 having anti-rotation tabs 44.

As may be observed in FIG. 2, wheeled center stand 20 incorporates spine 22 rotatably attached to frame 14, and a pair of substantially parallel legs 4 rigidly attached to spine 22, one at each end. Pad 6 is rigidly attached to an end of one leg 4 opposite spine 22; swiveling wheel 30 is attached to an end of the other leg 4 opposite spine 22. Foot lever 8 is rigidly attached to one leg 4 in conventional fashion, and legs 4 are extended and retracted in conventional fashion relative to a motorcycle to which wheeled center stand 20 is attached.

Swiveling wheel 30 is free to rotate relative to the leg 4 to which it is attached as illustrated by arrow 32. In addition, wheel 30 is free to roll, as indicated by arrow 34 in FIG. 2. A motorcycle to which wheeled center stand 20 is attached can be turned around substantially within its own length by rolling swiveling wheel 30 as indicated by arrow 38 along an arc 36 of a circle whose center is pad 6, and whose radius is the distance between legs 4.

For example, when swiveling wheel 30 has traveled 180 degrees along arc 36 around pad 6, the motorcycle to which it is attached will have reversed the direction in which points. Because swiveling wheel 30 is free to roll along arc 38, the only appreciable friction to overcome is that between pad 6 and a surface upon which wheeled center stand 20 rests, which friction is minimal. Thus, the instant wheeled center stand 20 permits a motorcycle operator to turn a motorcycle around in tight quarters, with minimal effort. This can be very useful in situations such as driving into a garage, turning the motorcycle around, and then driving the motorcycle out of the garage, all without great exertion of energy or strength.

Figure 3:
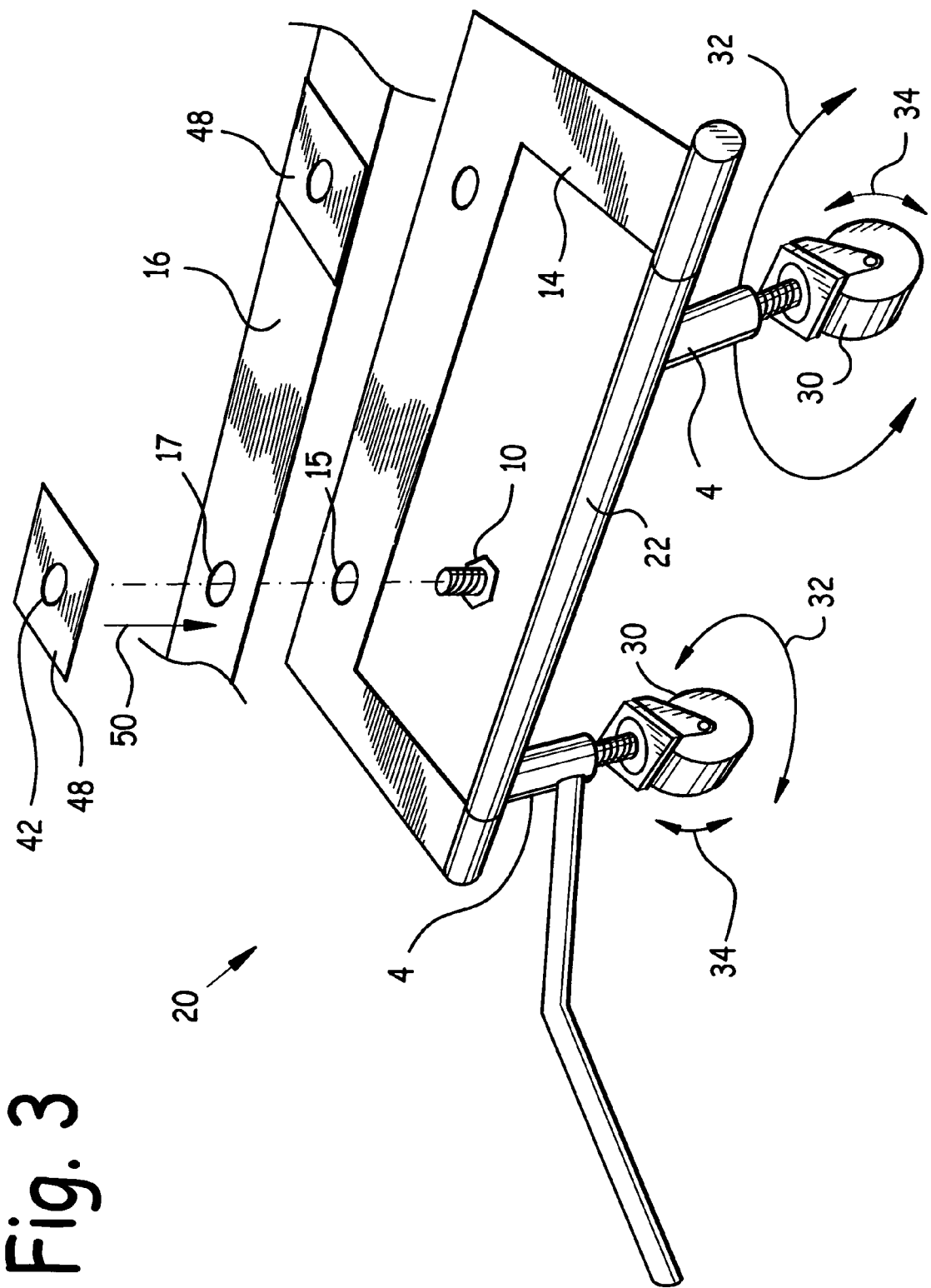
FIG. 3 is a rear quarter elevated isometric view of a wheeled motorcycle center stand incorporating two legs and two swiveling wheels, and its attachment to a motorcycle cross-member using a bolt and a nut plate made of magnetic material.

FIG. 3 is a rear quarter elevated isometric view of an alternate embodiment wheeled motorcycle center stand 20 incorporating two legs 4 and two swiveling wheels 30, and its attachment to a motorcycle cross-member 16 using a bolt 10 and a magnetic nut plate 48 made of magnetic material. One swiveling wheel 30 is attached to an extreme of each leg 4 opposite spine 22.

Each swiveling wheel 30 is free to rotate relative to the leg 4 to which it is attached as illustrated by arrows 32. In addition, each wheel 30 is free to roll, as indicated by arrows 34. A motorcycle to which wheeled center stand 20 is attached can be turned around substantially within its own length simply by rotating the motorcycle on the surface upon which swiveling wheels 30 rest, and swiveling wheels 30 will roll as indicated by arrows 34, and swivel as indicated by arrows 32, so as to permit the motorcycle to be quickly and easily turned around, or even moved sideways if so desired.

Figure 1:
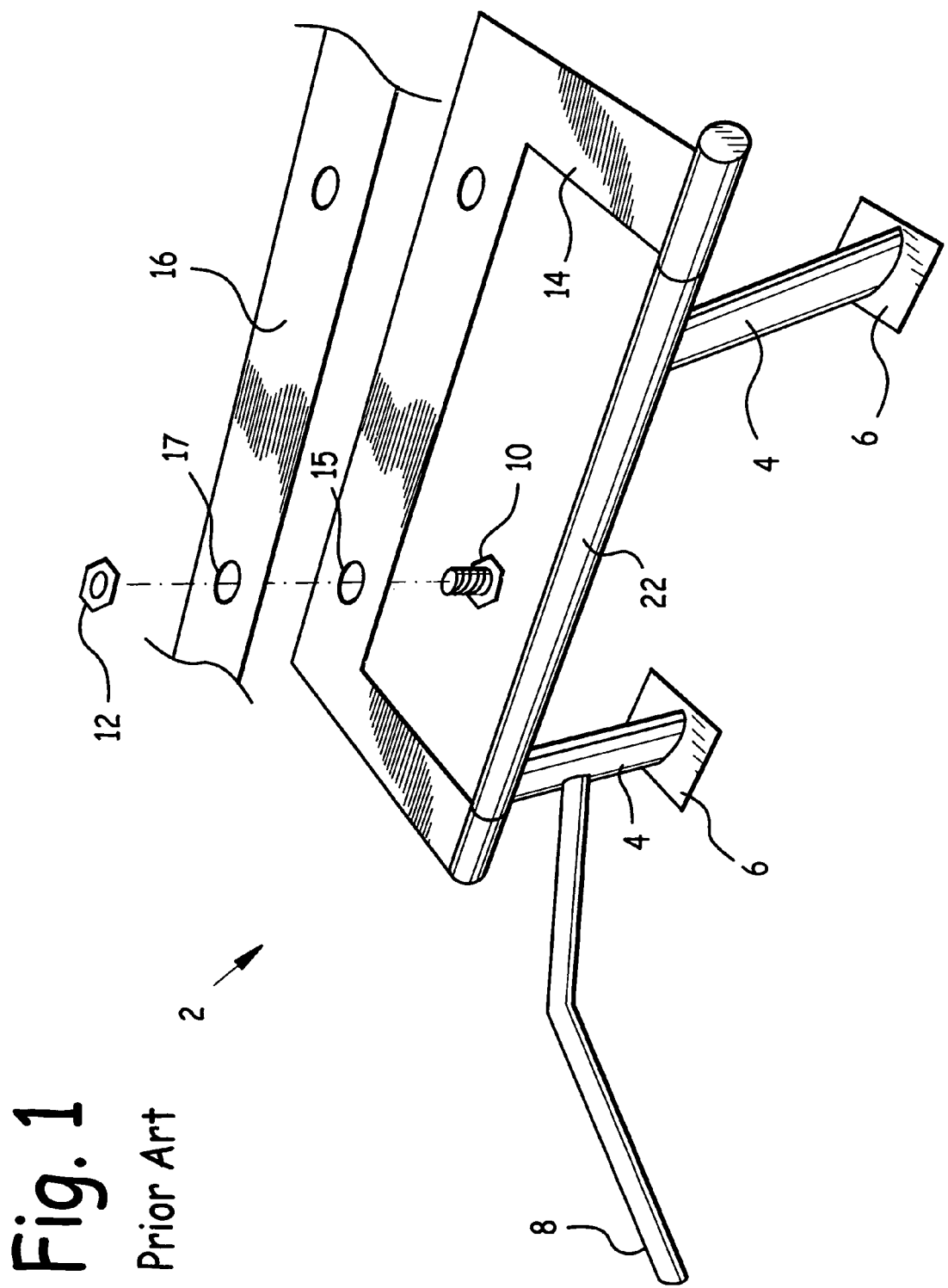
FIG. 1 is a rear quarter elevated isometric view of a prior art center stand and its attachment to a motorcycle cross-member.

As was mentioned previously, one problem associated with motorcycle center stand installations is the difficulty of threading bolt 10 into nut 12, as depicted in FIG. 1. Accordingly, one feature of the instant wheeled center stand invention is the nut plates 40, 48 depicted in FIGS. 2 and 3. The nut plate 40 embodiment shown in FIG. 2 incorporates a pair of anti-rotation tabs 44 along opposite edges of nut plate 40, spaced far enough apart so as to embrace the width of cross-member 16 when nut plate 40 is placed atop cross-member 16 with its anti-rotation tabs 44 pointing downwards.

Each anti-rotation tab 44 is substantially perpendicular to a plane containing nut plate 40. Nut plate 40 further comprises nut plate threaded bore 42, sized to mate with bolt 10.

In practice, nut plate 40 is placed atop cross-member 16 so that nut plate anti-rotation tabs 44 embrace cross-member 16, and nut plate threaded bore 42 aligns with cross-member bore 17, as indicated by arrow 46. The nut plate 40 on the right side of cross-member 16 depicted in FIG. 2 has been thus emplaced, ready for bolt 10 to be threaded into it.

Next, frame 14 is placed under cross-member 16 so that each frame bore 15 aligns with a respective cross-member bore 17 and a nut plate threaded bore 42 emplaced atop cross-member 16 (as explained in the previous step).

Finally, a bolt 10 is inserted through a respective frame bore 15 and cross-member bore 16, and threaded and tightened into nut plate threaded bore 42. This process is repeated for each frame bore 15/cross-member bore 17 pair—generally there are two.

The magnetic nut plate 48 embodiment shown in FIG. 3 is intended to be used with a ferro-magnetic cross-member 16, and incorporates nut plate threaded bore 42, sized to mate with bolt 10.

In practice, magnetic nut plate 48 is placed atop cross-member 16 so nut plate threaded bore 42 aligns with cross-member bore 17, as indicated by arrow 50. Magnetic nut plate 48 is held in place atop cross-member 16 due to the magnetic attraction between magnetic nut plate 48 and the ferro-magnetic material from which cross-member 16 is made. The magnetic nut plate 48 on the right side of cross-member 16 depicted in FIG. 3 has been thus emplaced, ready for bolt 10 to be threaded into it.

Next, frame 14 is placed under cross-member 16 so that each frame bore 15 aligns with a respective cross-member bore 17 and a magnetic nut plate threaded bore 42 emplaced atop cross-member 16 (as explained in the previous step).

Finally, a bolt 10 is inserted through a respective frame bore 15 and cross-member bore 16, and threaded and tightened into magnetic nut plate threaded bore 42. This process is repeated for each frame bore 15/cross-member bore 17 pair—generally there are two.

Figure 4:
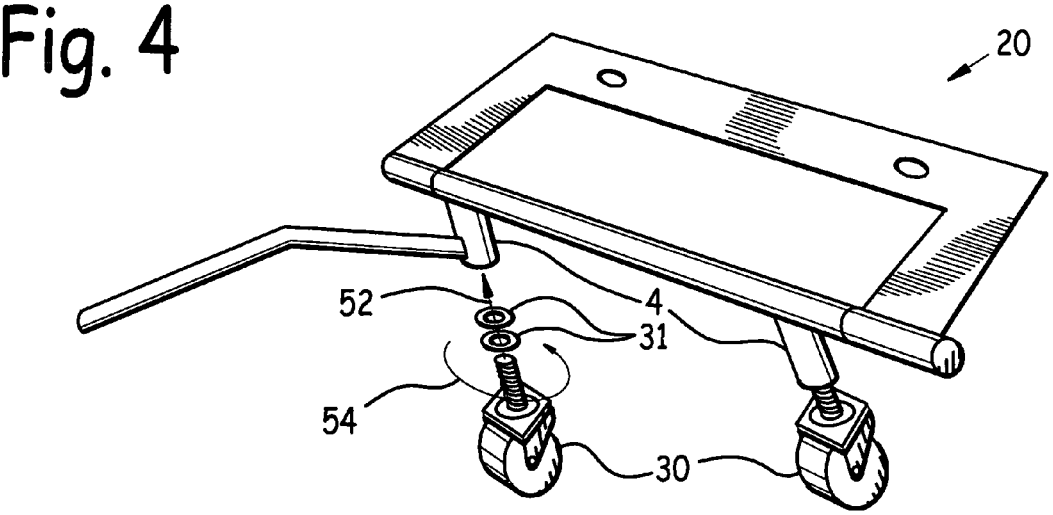
FIG. 4 is a rear quarter elevated isometric view of a wheeled motorcycle center stand incorporating two legs and two swiveling wheels, and its means of adjusting wheel height.
Figure 5:
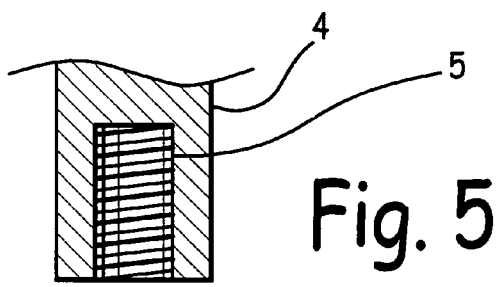
FIG. 5 is a side cross-sectional view of the instant wheel height adjustment.
Figure 6:
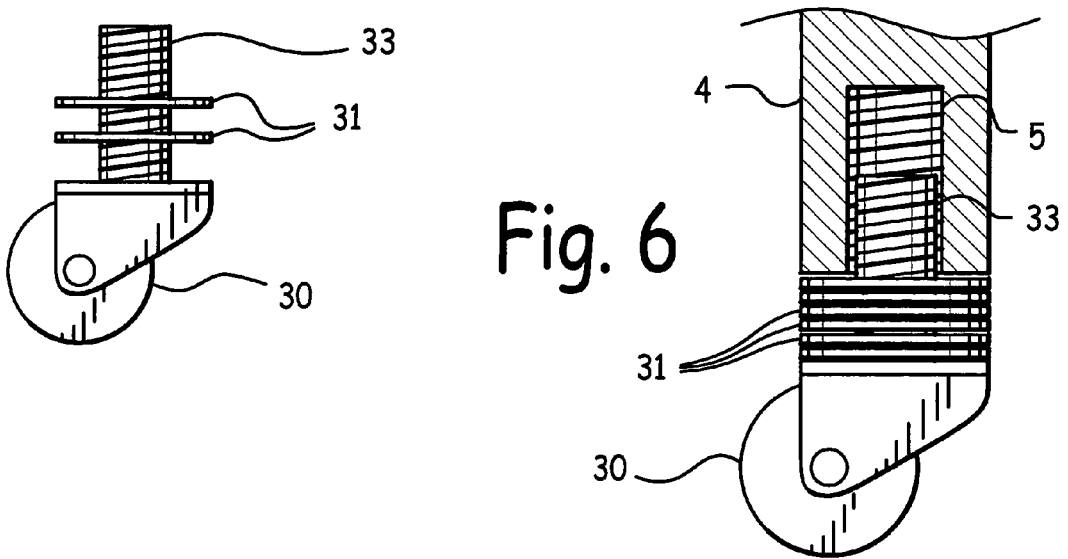
FIG. 6 is a side cross-sectional view of the instant wheel height adjustment, with washers between a swiveling wheel and a leg lower extreme.

FIG. 4 is a rear quarter elevated isometric view of a wheeled motorcycle center stand 20 incorporating two legs 4 each terminating in a swiveling wheel 30, and its means of adjusting wheel height. FIG. 5 is a side cross-sectional view of the instant wheel height adjustment. FIG. 6 is a side cross-sectional view of the instant wheel height adjustment, with washers 31 between a swiveling wheel 30 and a leg 4 lower extreme.

As may be observed in these figures, each leg 4 to which a swiveling wheel 30 is attached comprises leg threaded bore 5. Swiveling wheel 30 comprises swiveling wheel threaded stud 33 sized to mate with leg threaded bore 5. Washer(s) 31 are sized to slidably admit swiveling wheel threaded stud 33.

Swiveling wheel 30 is installed on a respective leg 4 by sliding an appropriate number of washers 31 over swiveling wheel threaded stud 33, and inserting swiveling wheel threaded stud 33 into leg threaded bore 5 as indicated by arrow 52 in FIG. 4, and then threading and tightening swiveling wheel threaded stud 33 into leg threaded bore 5 as indicated by arrow 54 until the configuration illustrated in FIG. 6 is achieved. Note that the washers 31 entrapped on swiveling wheel threaded stud 33 between swiveling wheel 30 and leg 4 serve to support leg 4 and the motorcycle weight resting on it, as well as to stabilize the attachment between swiveling wheel 30 and leg 4 by preventing angular motion or "cocking" of swiveling wheel 30 relative to leg 4.

In addition, by supporting leg 4 and the motorcycle weight resting upon it, washers 31 prevent undue stress on the threads of swiveling wheel threaded stud 33 and leg threaded bore 5. The number of washers 31 installed over swiveling wheel threaded stud 33 (as explained above) may be varied, depending on the height adjustment desired of leg 4 relative to swiveling wheel 30.

Figure 7:
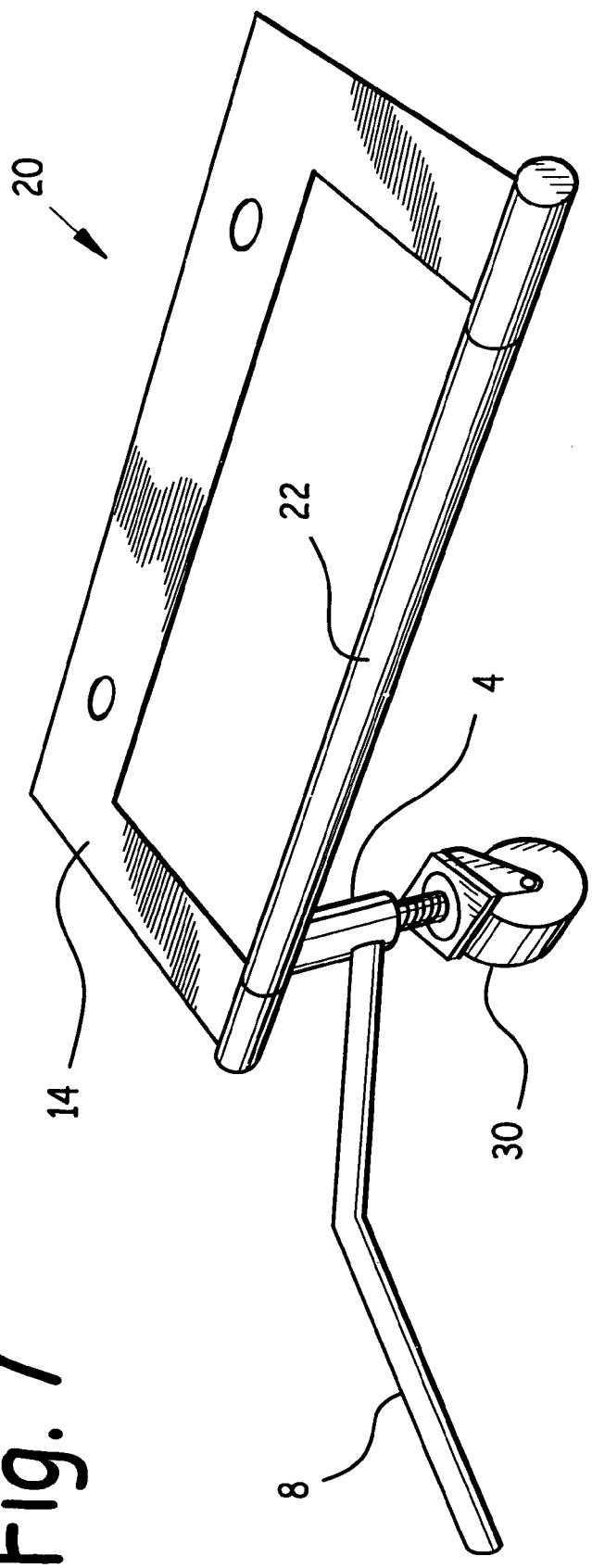
FIG. 7 is a rear quarter elevated isometric view of a wheeled motorcycle center stand incorporating one leg and one swiveling wheel.

FIG. 7 is a rear quarter elevated isometric view of a wheeled center stand 20 embodiment incorporating one leg 4 terminating in a swiveling wheel 30. This embodiment wheeled center stand 20 is attached to a motorcycle cross-member as explained above, and extended and retracted in conventional fashion. Care should be taken to balance the motorcycle on the single swiveling wheel 30 while turning the motorcycle and/or it moving sideways.

Figure 8:
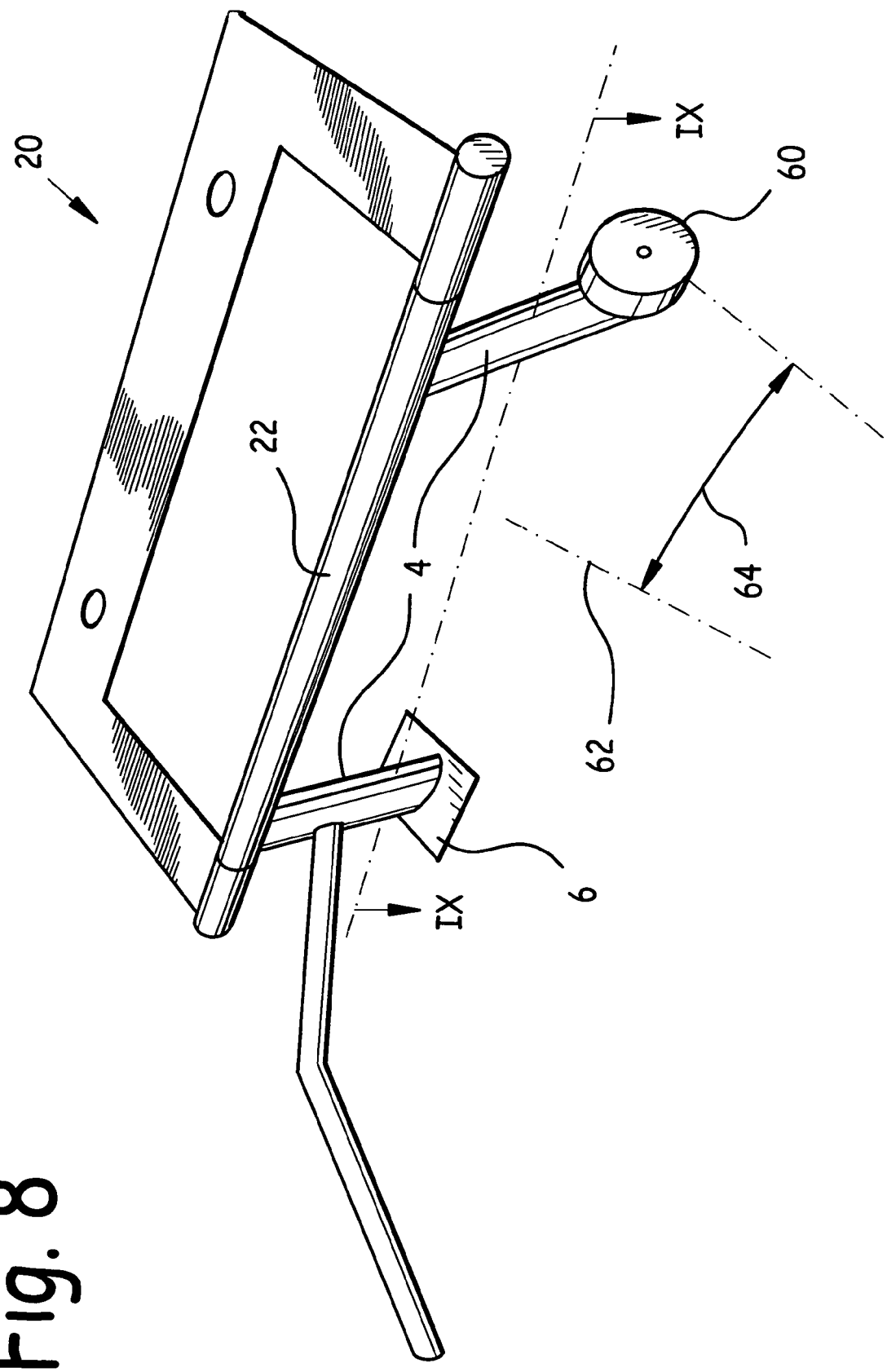
FIG. 8 is a rear quarter elevated isometric view of a wheeled motorcycle center stand incorporating two legs and one non-swiveling wheel.
Figure 9:
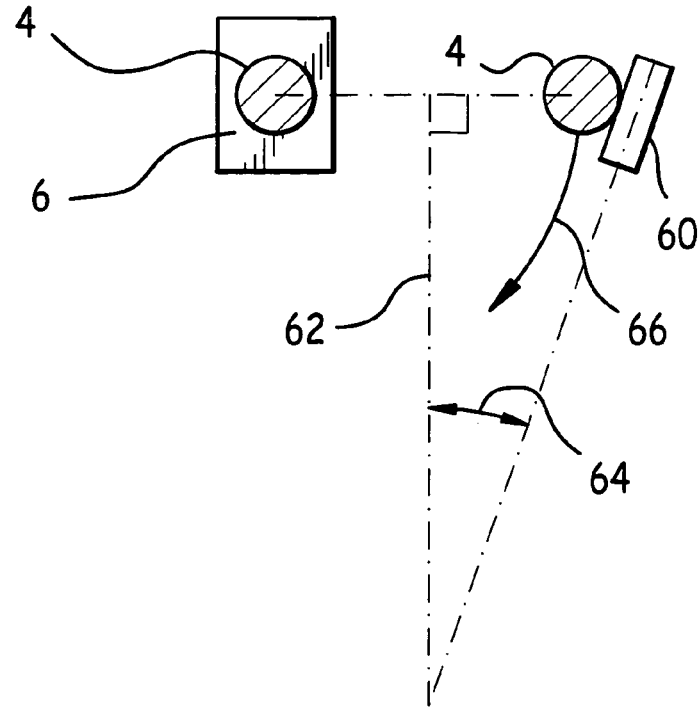
FIG. 9 is a top cross-sectional view of a wheeled motorcycle center stand incorporating two legs and one non-swiveling offset wheel, taken at section IX-IX of FIG. 8.
Figure 10:
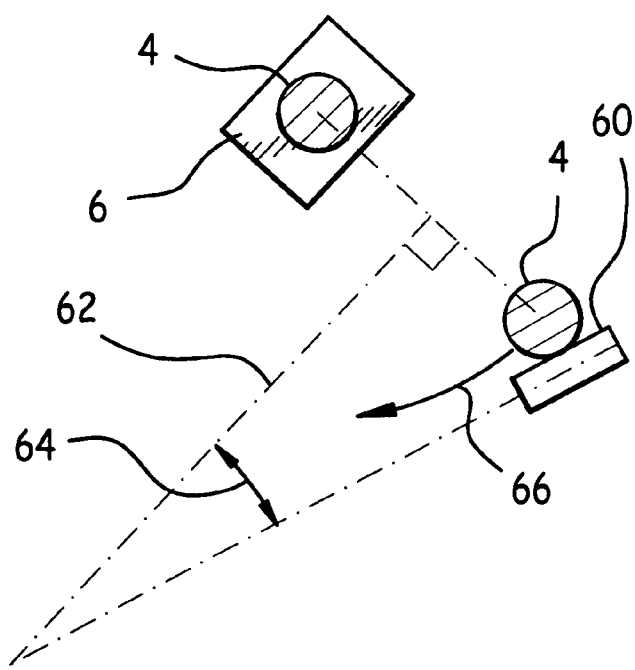
FIG. 10 is a top cross-sectional view of a wheeled motorcycle center stand incorporating two legs and one non-swiveling offset wheel, pivoting about its non-wheel leg.

FIG. 8 is a rear quarter elevated isometric view of a wheeled motorcycle center stand 20 embodiment incorporating two legs 4 and one non-swiveling wheel 60. FIG. 9 is a top cross-sectional view of the wheeled motorcycle center stand 20 incorporating two legs 4 and one non-swiveling offset wheel 60, taken at section IX-IX of FIG. 8. FIG. 10 is a top cross-sectional view of the wheeled motorcycle center stand 20 incorporating two legs 4 and one non-swiveling offset wheel 60.

As may be observed in these figures, non-swiveling offset wheel 60 is rotatably attached to an extreme of one leg 4 opposite spine 22. It was determined experimentally that an offset would make it easier to turn a motorcycle to which this embodiment wheeled center stand is attached around, as indicated by arrow 66 in FIG. 9.

It was determined experimentally that mounting non-swiveling offset wheel 60 to leg 4 at an offset angle 64 of 20 degrees±10 degrees relative to centerline 62 produced the easiest rotation of a motorcycle to which this wheeled center stand 20 embodiment was attached. Centerline 62 is defined as a line which is perpendicular to a line through the centers of legs 4 when viewed from above, and which is contained in a plane upon which wheeled center stand 20 rests. Although in the preferred embodiment non-swiveling wheel 60 was attached to a leg 4 at an offset angle 64 of 20 degrees±10 degrees relative to centerline 62, it is intended to fall within the scope of this embodiment that non-swiveling wheel 60 may be attached to a leg 4 at any offset angle 64.

FIG. 10 depicts a wheeled center stand being rotated around pad 6 as indicated by arrow 66 in FIG. 9. In the view shown in FIG. 10, wheeled center stand 20 has been rotated approximately 45 degrees clockwise (viewed from the top) from its orientation in FIG. 9. Of course, the motorcycle to which wheeled center stand 20 is attached has also rotated approximately 45 degrees clockwise, as indicated by arrow 66 in FIG. 9. To reverse the direction in which the motorcycle to which wheeled center stand 20 is attached faces, wheeled center stand 20 (and the motorcycle to which it is attached) should continue to be turned as indicated by arrow 68 in FIG. 10 until the wheeled center stand 20 (and its attached motorcycle) has rotated 180 degrees relative to its orientation in FIG. 9.

Figure 11:
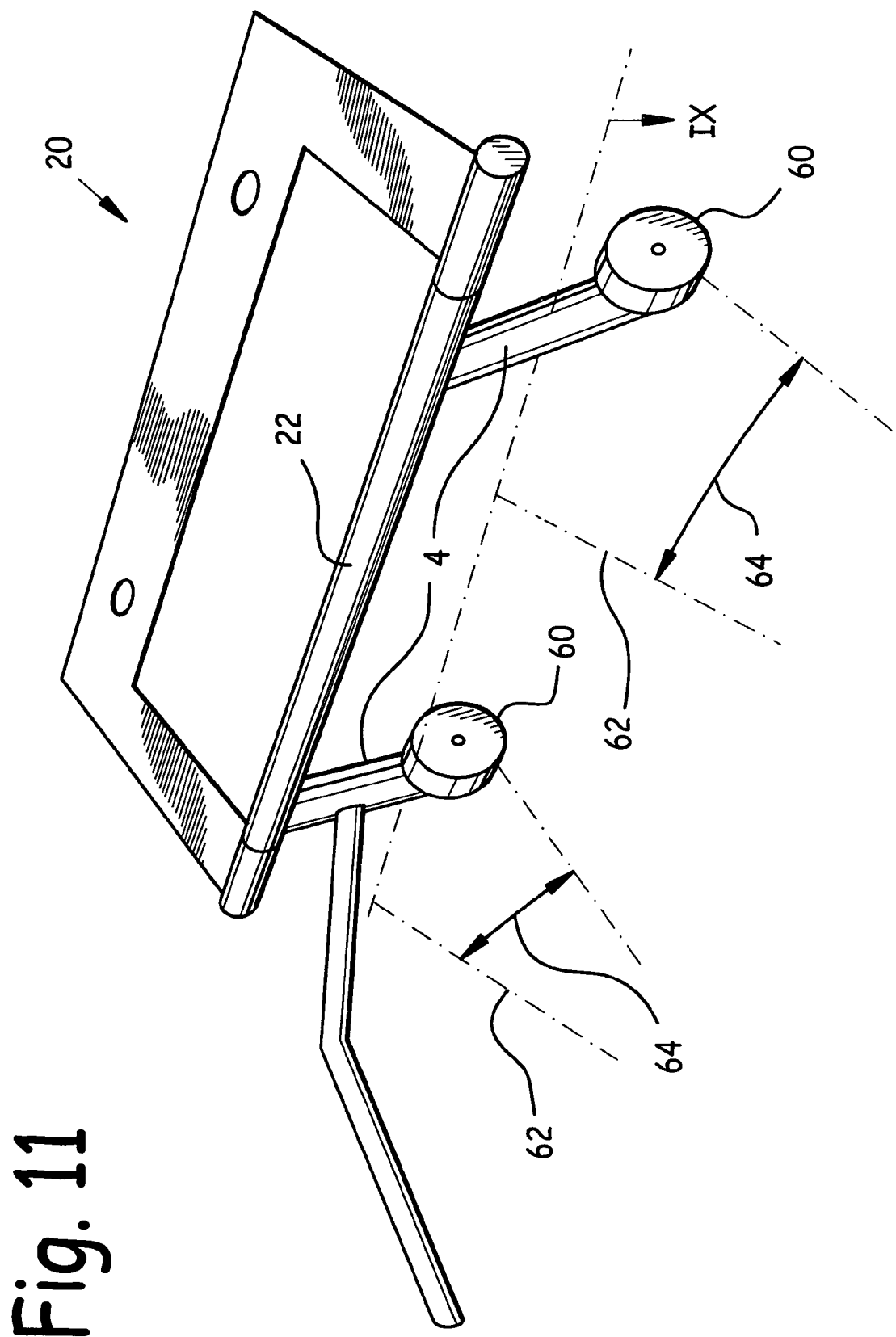
FIG. 11 is a top cross-sectional view of a wheeled motorcycle center stand incorporating two legs and two non-swiveling offset wheels.

FIG. 11 is a top cross-sectional view of a wheeled motorcycle center stand 20 incorporating two legs 4, each with a non-swiveling wheel 60 attached at an extreme opposite spine 22. In the preferred embodiment, each non-swiveling wheel 60 was attached to its respective leg 4 at an offset angle 64 of 20 degrees±10 degrees relative to centerline 62. It was determined experimentally that this offset angle 64 produced the easiest turning of a motorcycle to which wheeled center stand 20 was attached.

Although in the preferred embodiment non-swiveling wheels 60 were attached to respective legs at an offset angle 64 of 20 degrees±10 degrees relative to centerline 62, it is intended to fall within the scope of this disclosure that non-swiveling wheels 60 may be attached to respective legs 4 at any offset angle 64.

The embodiments of wheeled center stand 20 disclosed in FIGS. 8-11 are extended and retracted in conventional fashion, by pulling back on the motorcycle while stepping down on foot lever 8. Once extended, the motorcycle to which each is mounted may be easily rotated relative to the surface upon which it rests as explained above, with minimum exertion on the part of the motorcycle operator. Where offset angle 64 is 20 degrees±10 degrees relative to centerline 62, it was determined experimentally that the sense of motorcycle rotation which required the least effort was clockwise when viewed from the top, as indicated by arrows 66 and 68 in FIGS. 9 and 10.

In this disclosure, the term "motorcycle" is intended to include any two-wheeled vehicle, powered or un-powered, including but not limited to motor scooters, mopeds, bicycles, velocipedes, etc. It is contemplated to fall within the scope of this disclosure the instant wheeled center stand be used to rotate, turn, or move motorcycles sideways across a surface upon which the motorcycle rests.

In the preferred embodiment, frame 14, spine 22, legs 4, foot lever 8, nut plate 40, and pad 6 were made of metal, steel, iron, or other appropriate material. Swiveling wheels 30, non-swiveling wheels 66, bolt 10 and washers 31 were commercially available, off-the-shelf items. Cross-member 16 was made of ferromagnetic material, and magnetic nut plate 48 was made of magnetic material.

While a preferred embodiment of the invention has been illustrated herein, it is to be understood that changes and variations may be made by those skilled in the art without departing from the spirit of the appending claims.

DRAWING ITEM INDEX 2 conventional center stand
4 leg 5 leg threaded bore
6 pad
8 foot lever
10 bolt
12 nut
14 frame
15 frame bore
16 cross-member
17 cross-member bore
20 wheeled center stand
22 spine
30 swiveling wheel
31 washer
32 arrow
33 swiveling wheel threaded stud
34 arrow
36 arc
38 arrow
40 nut plate
42 nut plate threaded bore
44 anti-rotation tab
46 arrow
48 magnetic nut plate
50 arrow
52 arrow
54 arrow
60 non-swiveling wheel
62 centerline
64 offset angle
66 arrow
68 arrow

I claim:

1. A wheeled center stand comprising a spine rotatably attached to a frame; at least one leg attached to said spine; a swiveling wheel attached to said at least one leg; a cross-member rigidly attached to a motorcycle frame, at least one cross-member bore in said cross-member; a frame bore in said frame corresponding to each said cross-member bore; a bolt sized to slidably fit through said frame bore and said cross-member bore; a nut plate comprising a nut plate threaded bore sized to mate with said bolt; and a pair of anti-rotation tabs disposed along opposite edges of said nut plate, said anti-rotation tabs being substantially perpendicular to said nut plate and spaced apart a distance sufficient to slidably admit a width of said cross-member between them.

2. A wheeled center stand comprising a spine rotatably attached to a frame; at least one leg attached to said spine; a swiveling wheel attached to said at least one leg; a cross-member rigidly attached to a motorcycle frame, at least one cross-member bore in said cross-member; a frame bore in said frame corresponding to each said cross-member bore; a bolt sized to slidably fit through said frame bore and said cross-member bore; and a magnetic nut plate comprising a nut plate threaded bore sized to mate with said bolt, said cross-member being made of ferromagnetic material.

3. A wheeled center stand attached to a cross-member; said wheeled center stand comprising a spine rotatably attached to a frame; at least one leg attached to said spine; a swiveling wheel attached to said at least one leg; and means of adjusting a height of said leg relative to said swiveling wheel comprising a leg threaded bore in said leg, a mating swiveling wheel threaded stud attached to said swiveling wheel, and at least one washer around said swiveling wheel threaded stud, said at least one washer being sized to slidably admit said swiveling wheel threaded stud, at least part of said swiveling wheel threaded stud being threaded into said leg threaded bore; said spine being attached to said cross-member by means of a bolt through a frame bore and a corresponding cross-member bore, a nut plate comprising a nut plate threaded bore sized to mate with said bolt, and a pair of anti-rotation tabs disposed along opposite edges of said nut plate, said anti-rotation tabs being substantially perpendicular to said nut plate and spaced apart a distance sufficient to slidably admit a width of said cross-member between them.

4. A wheeled center stand attached to a cross-member; said wheeled center stand comprising a spine rotatably attached to a frame; at least one leg attached to said spine; a swiveling wheel attached to said at least one leg; and means of adjusting a height of said leg relative to said swiveling wheel comprising a leg threaded bore in said leg, a mating swiveling wheel threaded stud attached to said swiveling wheel, and at least one washer around said swiveling wheel threaded stud, said at least one washer being sized to slidably admit said swiveling wheel threaded stud, at least part of said swiveling wheel threaded stud being threaded into said leg threaded bore; said spine being attached to said cross-member by means of a bolt through a frame bore and a corresponding cross-member bore, and a magnetic nut plate comprising a nut plate threaded bore sized to mate with said bolt, said cross-member being made of ferromagnetic material.

* * * * *